W. A. Bemis,

Double-Acting Pump.

No. 1,856 Reissued Jan. 31, 1865.

Witnesses

Jas. R. Ball

Geo. A. Reed

Inventor:

William A. Bemis.

N. PETERS, PHOTO-LITHOGRAPHER, WASHINGTON, D. C.

UNITED STATES PATENT OFFICE.

WILLIAM A. BEMIS, OF LYNDON CENTRE, VERMONT.

IMPROVEMENT IN PUMPS.

Specification forming part of Letters Patent No. 43,755, dated August 9, 1864; Reissue No. 1,856, dated January 31, 1865.

*To all whom it may concern:*

Be it known that I, WILLIAM A. BEMIS, of Lyndon Centre, in the county of Caledonia and State of Vermont, have invented a new and Improved Pump; and I do hereby declare that the following is a full, clear, and exact description of the same, reference being had to the accompanying drawings, making a part of this specification, in which—

Figure 2:
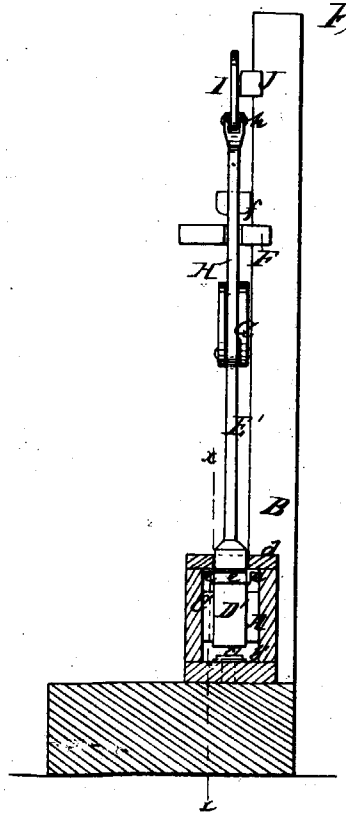
Figure 1:
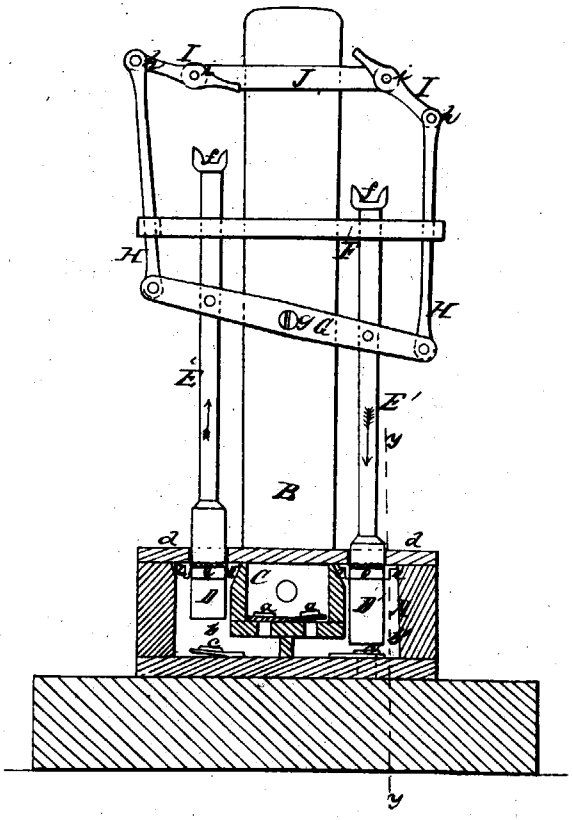

Figure 1 is a vertical section of my invention, taken in the line *x x*, Fig. 2; Fig. 2, a vertical section of the same, taken in the line *y y*, Fig. 1.

Similar letters of reference indicate corresponding parts in the two figures.

This invention relates to a new and improved pump designe l for general use; and it consists in the employment or use of two plungers or pistons, the rods of which are connected by a lever, and having other levers applied to them if desired, and all arranged with a platform in such a manner that the person in operating the pump may apply his power to it in the most favorable and advantageous manner. The plungers or pistons are also packed in such a manner as to insure the perfect working of the same with but little friction.

To enable those skilled in the art to fully understand and construct my invention, I will proceed to describe it.

A represents a water-box, which is submerged in the bottom of the well or receptacle from which the water is to be drawn.

B is a tube, which extends from the water-box above the surface of the well or reservoir to the point where it is desired to discharge the water. Within the water-box A there is a chamber, C, with which the lower end of the tube B communicates, and this chamber has two valves, *a a*, in its bottom opening upward. (See Fig. 1.) The water-box A is divided into two compartments, *b b′*, by a vertical partition underneath the chamber C at its center—a valve, *a*, in the chamber C over each compartment in the water-box A. The bottom of A is provided with two valves, *c c′*, opening upward, and one being in each compartment *b b′*.

D D′ represent two plungers or pistons, which may be either round or square. A plunger or piston works in each of the compartments *b b′* through the tops *d* thereof, said plungers working loosely through the top and having strips of packing *e*, which are attached to the under side of the tops *d* and bear against the sides of the plungers, the latter being represented as square. These strips of packing *e* are allowed to work freely toward and from the plungers.

E E′ are the plunger-rods, which extend upward above the top of the well and through a platform, F, on which the operator steps when about to operate the pump. The rods E E′ are allowed to work freely through the platform, and each is provided with a crotch or fork, *f*, at its upper end to receive the foot of the operator. (See Fig. 1.) The two rods E E′ are connected by a lever, G, the fulcrum-pin *g* of which passes into the tube B below the platform F, and to the outer ends of the lever G there are attached rods H, the upper ends of which are connected by pivots *h* to the outer ends of levers I I, having their fulcra-pins *i* at the outer ends of a horizontal bar, J, which is attached to the upper end of the tube B.

The operation is as follows: The operator steps upon the platform F and places a foot in a crotch or fork, *f*, at the upper end of each plunger-rod E E′, and grasps a lever, I, with each hand. As one lever is shoved upward by the operator, his body is naturally exerted downward and the rod E or E′ below it is assisted in being forced down, and the same result is attained by inclining the body in the opposite direction to force down the other plunger. As one plunger is forced down in its compartment of the water-box A, the valve *a* over it in the chamber C is raised and the water forced through said chamber into the tube B, the other valve *a* being closed. The water enters the compartments *b b′* through the valves *c c′* in their bottoms as the plungers are raised, and is alternately forced out of said compartments, one being filled while the other is being emptied of water. When the plungers are raised, the packing *e* is pressed water-tight against their sides by the force of the water, and when the plungers descend the water from the top forces the packing outward from the plungers. (See Fig. 1.) By this means the plungers are made to work properly with but little friction.

Having thus described my invention, what I claim as new, and desire to secure by Letters Patent, is—

The two plungers D D′, the rods E E′ of which are connected by a lever, G, having rods H connected to it, and all arranged with a platform, F, to operate as and for the purpose set forth.

WILLIAM A. BEMIS.

Witnesses:
WM. F. MCNAMARA,
C. L. TOPLIFF.